A. L. PUTNAM.

PROCESS OF FORMING TAPERING CROSS SECTION DISKS.

APPLICATION FILED JAN. 19, 1918.

Reissued Aug. 19, 1919.

14,713.

2 SHEETS—SHEET 1.

Inventor

Alden L. Putnam

By Whittemore, Hulbert & Whittemore

Attorneys

A. L. PUTNAM.
PROCESS OF FORMING TAPERING CROSS SECTION DISKS.
APPLICATION FILED JAN. 19, 1918.
Reissued Aug. 19, 1919.
14,713.
2 SHEETS—SHEET 2.
Fig. 7.
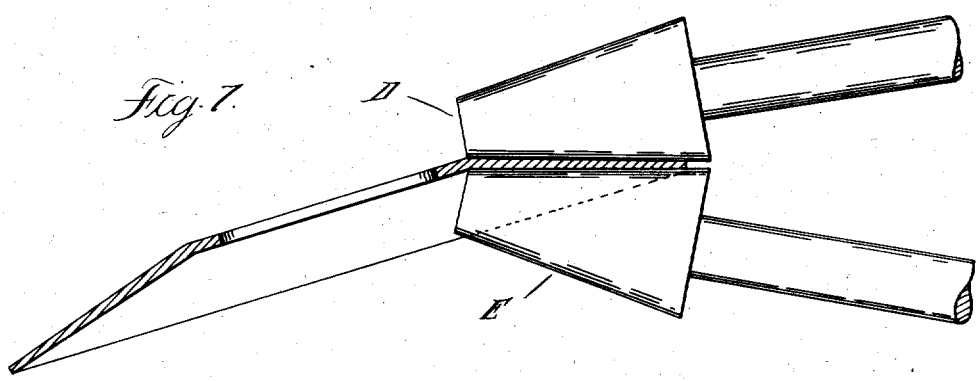
Fig. 6.
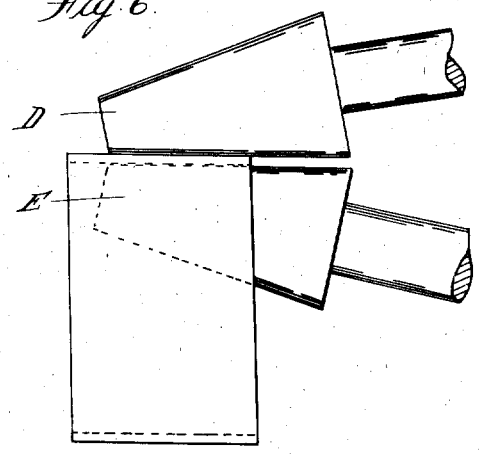
Fig. 8.
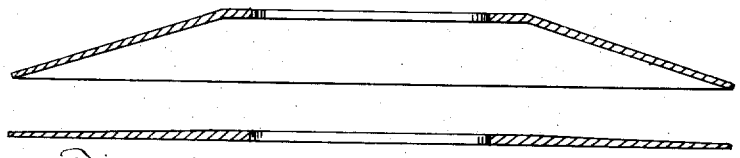
Fig. 9
Inventor
Alden L. Putnam
By Whittemore, Hulbert & Whittemore
Attorneys

UNITED STATES PATENT OFFICE.

ALDEN L. PUTNAM, OF DETROIT, MICHIGAN, ASSIGNOR TO DETROIT PRESSED STEEL COMPANY, OF DETROIT, MICHIGAN, A CORPORATION OF MICHIGAN.

PROCESS OF FORMING TAPERING CROSS-SECTION DISKS.

14,713. Specification of Reissued Letters Patent. Reissued Aug. 19, 1919.

Original No. 1,245,270, dated November 6, 1917, Serial No. 151,600, filed February 28, 1917. Application for reissue filed January 19, 1918. Serial No. 212,789.

*To all whom it may concern:*

Be it known that I, ALDEN L. PUTNAM, a citizen of the United States of America, residing at Detroit, in the county of Wayne and State of Michigan, have invented certain new and useful Improvements in Processes of Forming Tapering Cross-Section Disks, of which the following is a specification, reference being had therein to the accompanying drawings.

The invention relates to the manufacture of sheet metal disks of tapering cross section and more particularly to disks designed for use in the construction of vehicle wheels.

It is the object of the invention, first, to avoid waste of stock; and second, to facilitate the formation of a tapering cross section or varying gage from a blank of uniform gage.

With these objects in view the invention comprises the novel method as hereinafter set forth.

In the drawings:

Fig. 6 shows the initial operation of expanding the cylinder into disk form;

Fig. 7 is a similar vew at the completion of the operation;

Fig. 8 is a cross-section through the completed disk; and

Fig. 9 is a similar view showing a modification.

The specific embodiment of my invention illustrated is a method of forming disks for vehicle wheel bodies, the characteristic feature of which is a tapering gage or cross-section from the center to the periphery. Disks of this character may be formed from circular flat blanks of sheet metal which are rolled or otherwise expanded in diameter and thinned in cross section. Such a method is, however, open to objection that there is a large waste of sheet metal in the cutting of circular blanks. Furthermore, the operation of expanding the blanks diametrically is an exceedingly difficult one to perform.

With my improved method the disk is formed from a rectangular blank which may be cut from the stock without waste. Furthermore, instead of expanding the blank diametrically or in the plane thereof, it is first formed into a cylindrical annulus and the latter is then expanded, with the result that the gage or cross-section is tapered at the same time that the form is changed.

Figure 2:
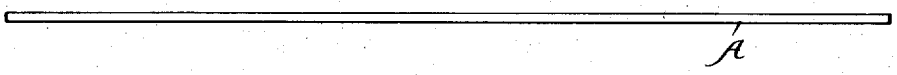
Figures 1 and 2 are respectively a plan view and side elevation of the blank.
Figure 1:
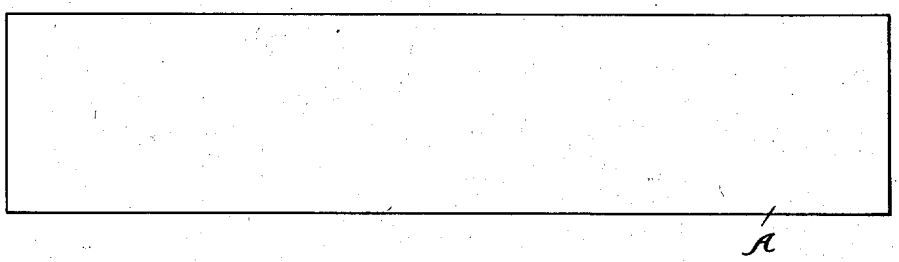
Figure 3:
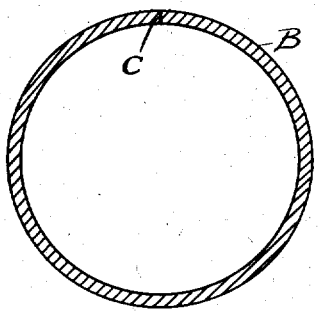
Fig. 3 is an elevation showing the first step of forming the blank into an annulus.
Figure 4:
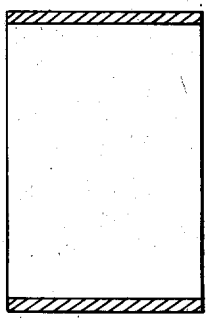
Fig. 4 is a longitudinal section thereof.
Figure 5:
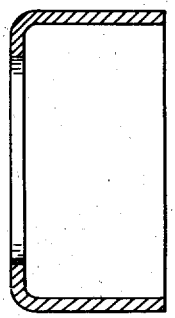
Fig. 5 illustrates the second step of cupping the cylindrical blank.

In detail, A is a rectangular sheet-metal blank preferably of a gage or thickness equal to the desired thickness of the central portion of the disk. This blank is first bent into an annulus B, Fig. 3, and the opposite ends thereof are butt-welded at C. The cylinder thus formed is then expanded at one end, preferably by rolling between tapering rolls, such as D and E, which will change the form from that shown in Fig. 6 to that shown in Fig. 7. If desired the operation may be continued until all portions of the blank are substantially in the same plane but for the construction of vehicle wheels this is not desirable, a dished disk being of greater strength. Thus Fig. 8 illustrates such a construction of dished disk while Fig. 9 shows a disk having all portions in the same plane.

Where the central aperture in the disk is relatively small it may be necessary to contract the diameter of one end of the cylindrical blank before expanding the other end thereof. This step is shown in Figs. 4 and 5, Fig. 4 illustrating the cylindrical blank just formed and Fig 5 a blank with a cupped or contracted end which is formed from the construction of Fig. 4 by the operation of suitable dies.

By use of my improved method the cost of manufacture is greatly reduced both in the saving of stock and the lessening of the difficulty in expanding the blank. It will be understood that the operations are preferably performed upon a hot blank so as to relieve the metal from over-straining.

What I claim as my invention is:

1. The method of forming disks of tapering cross-section comprising the bending of a sheet-metal blank into annular form, welding the opposite ends of said blank to form an integral annulus and expanding one end of the annulus to change the same into disk form.

2. The method of forming disks of tapering cross-section, comprising the cutting of a substantially rectangular blank from sheet-metal, bending said blank into an annulus, welding the ends of the blank to each other and expanding one end of the annulus to simultaneously change the same into disk form and progressively thin the cross-section thereof.

3. The method of forming tapering disks, comprising the cutting of a substantially rectangular blank from sheet-metal of uniform gage, bending said blank to form an annulus, welding the ends of the blank to each other, contracting or cupping one end of the annulus to reduce the diameter of the aperture therein and expanding the opposite end of the annulus to simultaneously change the same into disk form and tapering the cross section thereof.

4. The method of forming dished disks of tapering cross section, comprising the cutting of a substantially rectangular blank from sheet-metal of uniform gage, bending the blank to form an annulus, welding the ends of the blank to each other, cupping or contracting one end of the annulus to reduce the diameter of the aperture therein, and expanding the opposite end of the annulus to increase the diameter and reduce the cross-section thereof until a dished disk of the desired form is obtained.

5. The method of forming disks of tapering cross-section, comprising the cutting of a substantially rectangular blank from sheet-metal of uniform gage, bending said blank to form an annulus, welding the abutting ends of the blank to each other and rolling the annulus to expand the diameter of one end thereof simultaneously to progressively reduce the cross-section thereof.

6. The method of forming disks of tapering cross-section, comprising the application of reduction pressure progressively from one end toward the other, of an annulus to enlarge the diameter and decrease the thickness from the central portion toward the periphery.

7. The method of forming disks of tapering cross-section, comprising the forming of a substantially cylindrical annulus applying the reduction pressure progressively from one end toward the other of said cylinder to enlarge the diameter and decrease the thickness from the central portion toward the periphery.

8. The method of forming tapering disks, comprising the forming of an annulus, cupping one end of said annulus to reduce the diameter of the aperture therein and progressively expanding the annulus toward its opposite end to increase the diameter and reduce the thickness.

9. The method of forming disned disks of tapering cross-section, comprising the forming of a cupped annulus, and the rolling of the walls of said cup to progressively increase the diameter and reduce the thickness thereof.

In testimony whereof I have hereunto affixed my signature at Detroit, Wayne county, Michigan, upon this 4th day of January, 1918.

ALDEN L. PUTNAM.